(12) United States Patent
Bookheimer et al.

(10) Patent No.: US 10,449,608 B2
(45) Date of Patent: Oct. 22, 2019

(54) TOOLHOLDER ASSEMBLY WITH LOCK ROD

(71) Applicant: Kennametal Inc., Latrobe, PA (US)

(72) Inventors: Alan J. Bookheimer, Greensburg, PA (US); Jeremy Canonge, Monroeville, PA (US); Edward J. Rusnica, Jr., Irwin, PA (US)

(73) Assignee: KENNAMETAL INC., Latrobe, PA (US)

( * ) Notice: Subject to any disclaimer, the term of this patent is extended or adjusted under 35 U.S.C. 154(b) by 100 days.

(21) Appl. No.: 15/486,386

(22) Filed: Apr. 13, 2017

(65) Prior Publication Data

US 2018/0297124 A1    Oct. 18, 2018

(51) Int. Cl.
B23B 31/107 (2006.01)
B23B 29/04 (2006.01)

(52) U.S. Cl.
CPC ........ B23B 29/046 (2013.01); B23B 31/1071 (2013.01)

(58) Field of Classification Search
CPC ... B23B 29/046; B23B 29/1071; B23B 29/04; B23B 29/20; B23C 5/26
See application file for complete search history.

(56) References Cited

U.S. PATENT DOCUMENTS

| | | | |
|---|---|---|---|
| 4,747,735 A | | 5/1988 | Erickson et al. |
| 4,932,295 A | * | 6/1990 | Erickson ............... B23B 29/046 407/101 |
| 4,951,536 A | | 8/1990 | Robertson |
| 5,054,344 A | * | 10/1991 | Erickson ............... B23B 29/046 279/75 |
| 5,173,017 A | * | 12/1992 | Oshnock ............... B23B 29/046 279/2.23 |
| 5,197,720 A | | 3/1993 | Renz et al. |
| 5,245,896 A | | 9/1993 | Erickson et al. |
| 5,697,740 A | | 12/1997 | Von Haas et al. |
| 5,775,857 A | | 7/1998 | Johne |
| 6,076,441 A | | 6/2000 | Billington |
| 8,151,673 B2 | | 4/2012 | Erickson et al. |
| 2009/0235790 A1 | * | 9/2009 | Erickson ............... B23B 29/046 82/160 |

FOREIGN PATENT DOCUMENTS

DE   19818148 A1   10/1999
WO   1997014525 A2   4/1997

* cited by examiner

*Primary Examiner* — Nicole N Ramos
(74) *Attorney, Agent, or Firm* — Ian K. Samways

(57) ABSTRACT

A toolholder assembly includes a toolholder having a rearwardly facing toolholder shank, a base member having a bore configured for receiving the toolholder shank, a canister configured for receipt in the bore of the base member, a lock rod with an axial forward and an axial rearward end, wherein the axial forward end of the lock rod includes a compression void such as a compression aperture or compression slot formed therethrough, and at least one locking member in communication with the axial forward end of the lock rod.

22 Claims, 12 Drawing Sheets

TOOLHOLDER ASSEMBLY WITH LOCK ROD

BACKGROUND OF THE INVENTION

The invention relates to a toolholder assembly and, in particular a toolholder assembly with a lock rod.

Typically, metal working operations are performed using a cutting insert of a hard metal. Such an insert is mounted to a toolholder. The toolholder can be removably attached to a base member which is part of a machine such as, for example, a lathe or a milling machine. Various arrangements for removably attaching and/or adjusting parameters of the tool holder in relation to the base member such as, for example, a lock rod are generally known. Such arrangements often include either a screw mechanism or spring arrangement to, for example, increase allowable variation in a clamped or locked position while keeping the clamping or locking force within an acceptable range. In addition, the screw mechanism arrangement usually requires a specific means for activation, e.g., a torque wrench, while in the spring arrangement the size of the spring pack is typically large and is an issue. However, as the components wear during use the clamping or locking force naturally decreases and in both such arrangements there is no adjustment available in the clamped or locked position.

Thus, it would be desirable to provide an improved toolholder assembly that overcomes limitations, shortcomings and/or disadvantages of known such assemblies.

SUMMARY OF THE INVENTION

In accordance with an aspect of the invention, a toolholder assembly includes a toolholder having a rearwardly facing toolholder shank and an axial rearward end with an internal bore intersecting the axial rearward end, the toolholder shank having an outer surface and at least one locking aperture that extends from the outer surface to the internal bore. The toolholder assembly also includes a base member having a bore configured for receiving the toolholder shank and a canister configured for receipt in the bore of the base member, the canister having an outer surface and a canister bore that extends longitudinally through the canister, the canister having at least one locking passageway that extends from the outer surface of the canister to the canister bore and the at least one locking passageway is in communication with the at least one locking aperture of the toolholder shank. The tool holder further includes a lock rod with an axial forward and an axial rearward end, wherein the axial forward end of the lock rod includes a compression aperture formed therethrough and at least one locking member in communication with the axial forward end of the lock rod and movably positioned at least partially in the at least one locking passageway and/or the at least one locking aperture.

In accordance with another aspect of the invention, a toolholder assembly includes a toolholder having a rearwardly facing toolholder shank and an axial rearward end with an internal bore intersecting the axial rearward end, the toolholder shank having an outer surface and at least one locking aperture that extends from the outer surface to the internal bore. The toolholder assembly also includes a base member having a bore configured for receiving the toolholder shank and a canister configured for receipt in the bore of the base member, the canister having an outer surface and a canister bore that extends longitudinally through the canister, the canister having at least one locking passageway that extends from the outer surface of the canister to the canister bore and the at least one locking passageway is in communication with the at least one locking aperture of the toolholder shank. The tool holder further includes a lock rod with an axial forward and an axial rearward end, wherein the axial forward end of the lock rod includes a compression slot formed therein and at least one locking member in communication with the axial forward end of the lock rod and movably positioned at least partially in the at least one locking passageway and/or the at least one locking aperture.

In accordance with another aspect of the invention, a lock rod configured for cooperating with a toolholder and rotatable between locked and unlocked positions includes a lock rod body having an axial forward end and an axial rearward end. The axial forward end includes: a compression void formed therein; first and second ramping surfaces configured on opposing sides of the compression void; and first and second recesses adjacent to at least one of the first and second ramping surfaces, wherein at least a portion of the compression void passes through at least a portion of the first and second recesses.

These and other aspects of the present invention will be more fully understood following a review of this specification and drawings.

BRIEF DESCRIPTION OF THE DRAWINGS

FIG. 3A illustrates a sectional view along line 3A-3A of FIG. 3, in accordance with an aspect of the invention.

FIG. 3B illustrates a sectional view along line 3B-3B of FIG. 3, in accordance with an aspect of the invention.

DETAILED DESCRIPTION

Figure 1:
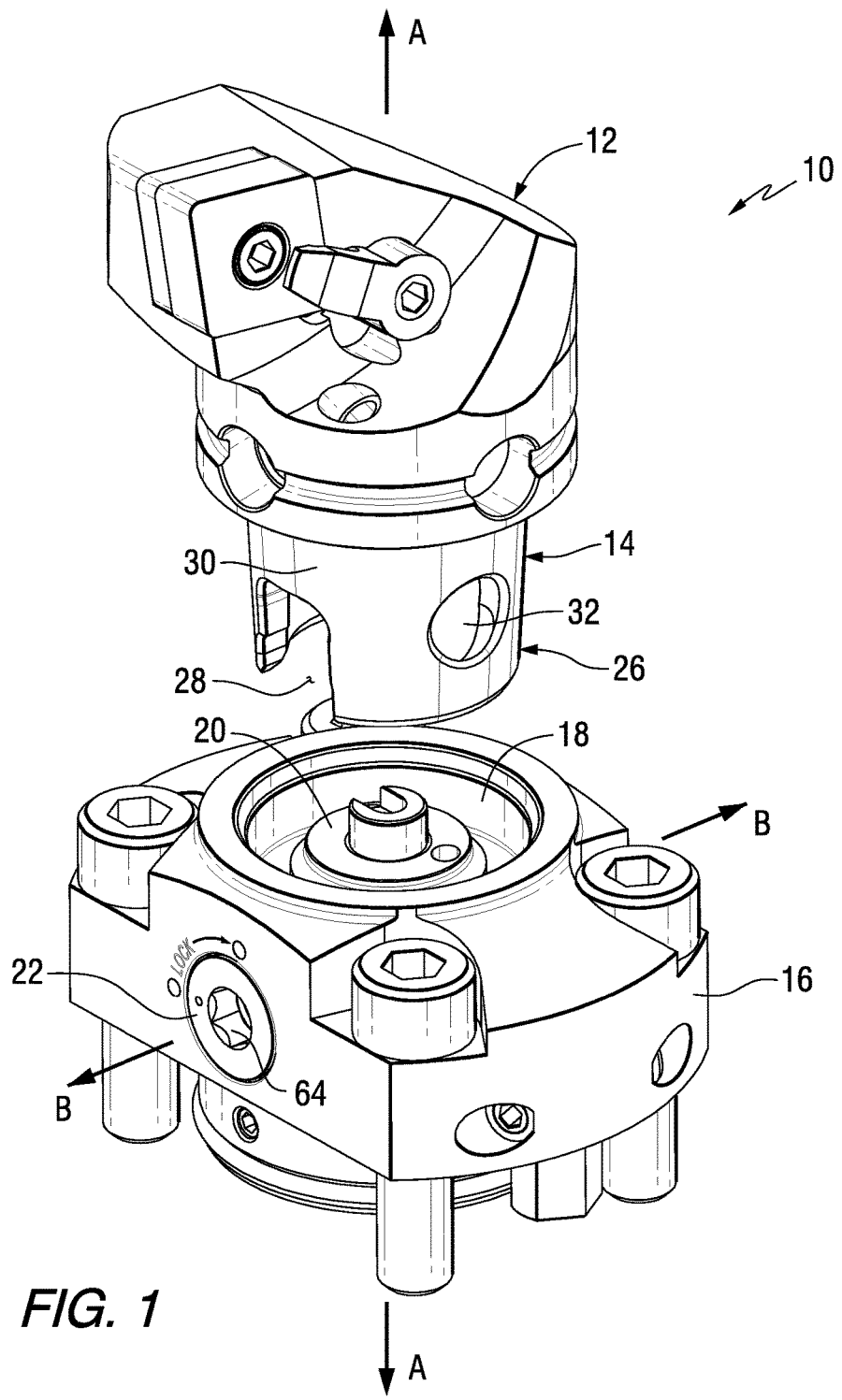
FIG. 1 illustrates a partially exploded view of a toolholder assembly, in accordance with an aspect of the invention.
Figure 4:
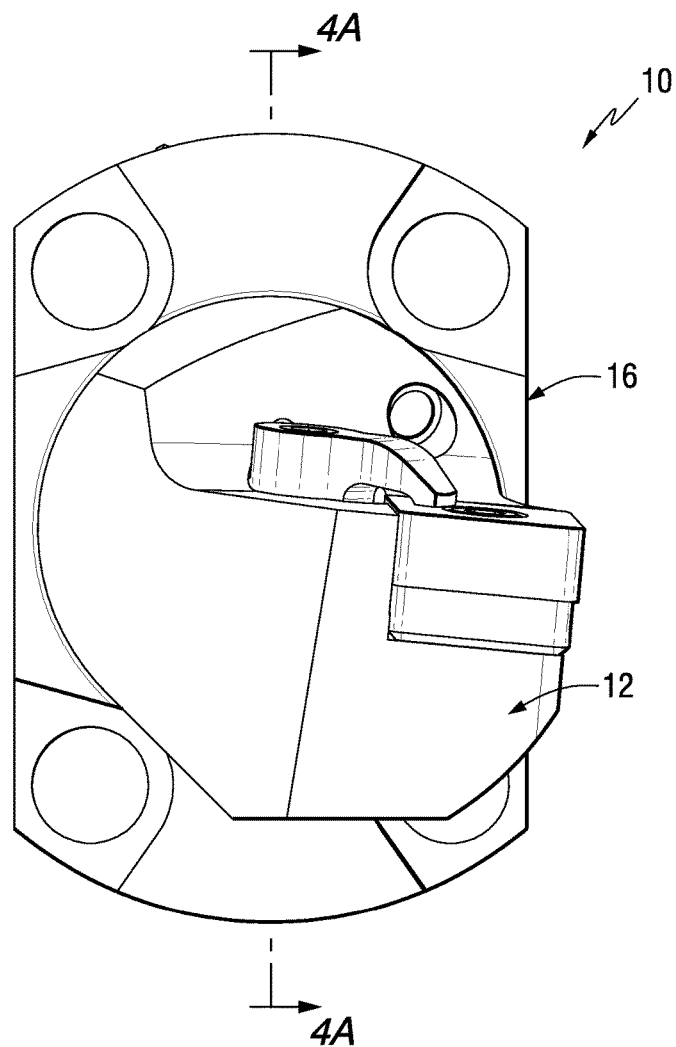
FIG. 4 illustrates an assembled top view of the toolholder assembly of FIG. 1, in accordance with an aspect of the invention.

Referring to FIGS. 1 and 4, there is illustrated a toolholder assembly 10 in accordance with aspects of the invention. The toolholder assembly 10 generally includes a toolholder 12 having a rearwardly facing shank 14, a base member 16 (sometimes referred to as a flange) having a bore 18 configured for receiving the shank 14, a canister 20 configured for receipt in the bore 18 of the base member 16 and a lock rod 22.

Figure 2:
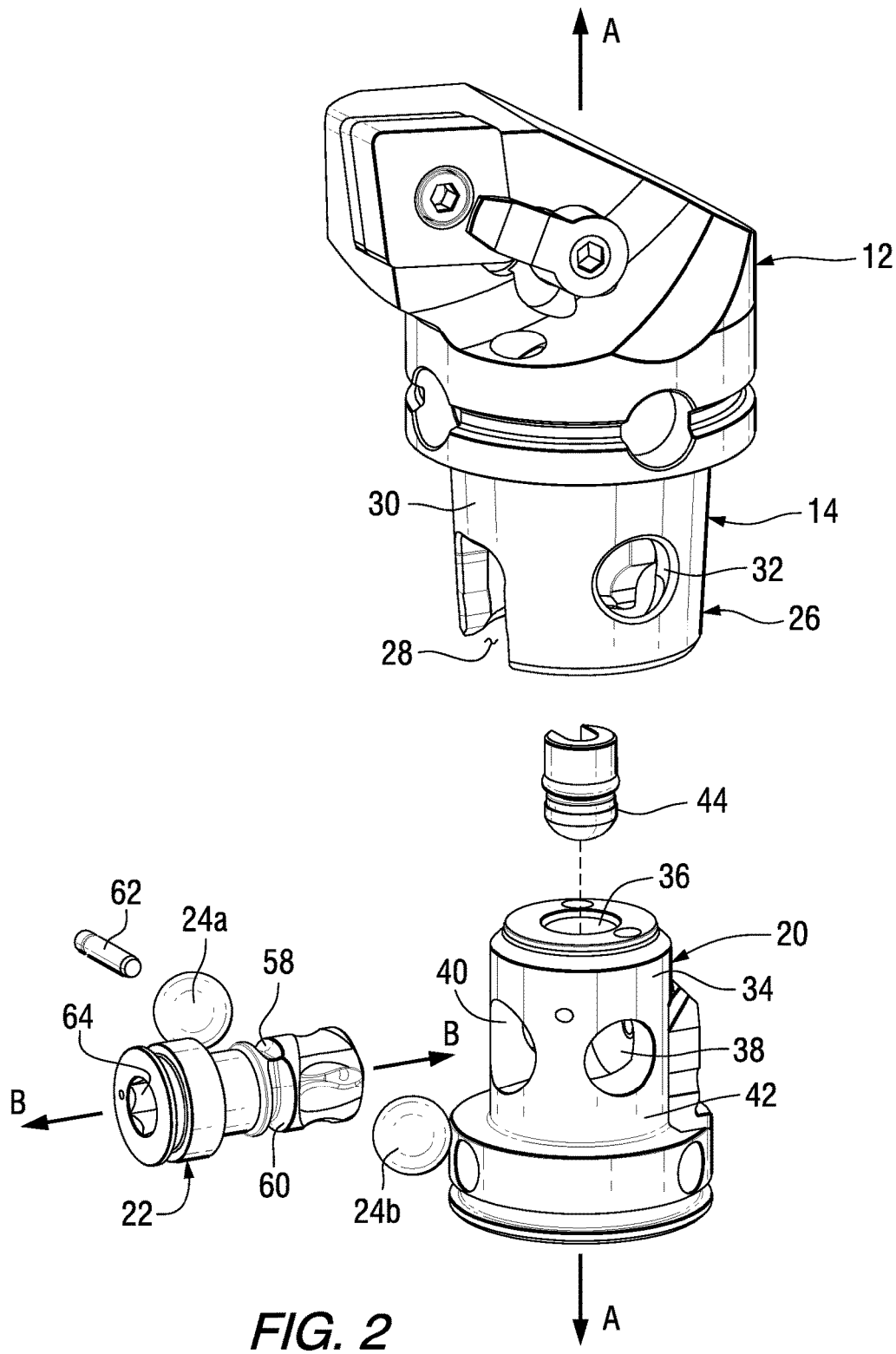
FIG. 2 illustrates an exploded view of a portion of the toolholder assembly of FIG. 1, in accordance with an aspect of the invention.

FIG. 2 illustrates an exploded view generally showing the toolholder 12, canister 20, lock rod 22 and at least one locking member, which in one aspect includes locking balls 24a, 24b. The tool holder 12 and canister 20 extend along a longitudinal axis A-A while the lock rod 22 is rotatable about a longitudinal axis B-B. In one aspect, the longitudinal axis A-A is non-parallel to the longitudinal axis B-B.

Referring to FIGS. 1 and 2, the toolholder 12 further includes an axial rearward end 26 with an internal bore 28 intersecting the axial rearward end 26. The toolholder shank 14 has an outer surface 30 and at least one locking aperture 32 that extends from the outer surface 30 to the internal bore 28.

FIG. 2 further illustrates that the canister 20 has an outer surface 34 and a canister bore 36 that extends longitudinally along axis A-A through the canister 20. The canister 20 further includes at least one locking passageway 38 that extends from the outer surface 34 of the canister 20 to the canister bore 36. In one aspect, the at least one locking passageway 38 is in communication with or adjacent to the at least one locking aperture 32 of the toolholder shank 14. In addition, the canister 20 has an additional bore 40 that extends along the longitudinal axis B-B of the lock rod 22 and is configured for receiving the lock rod 22.

Figure 4A:
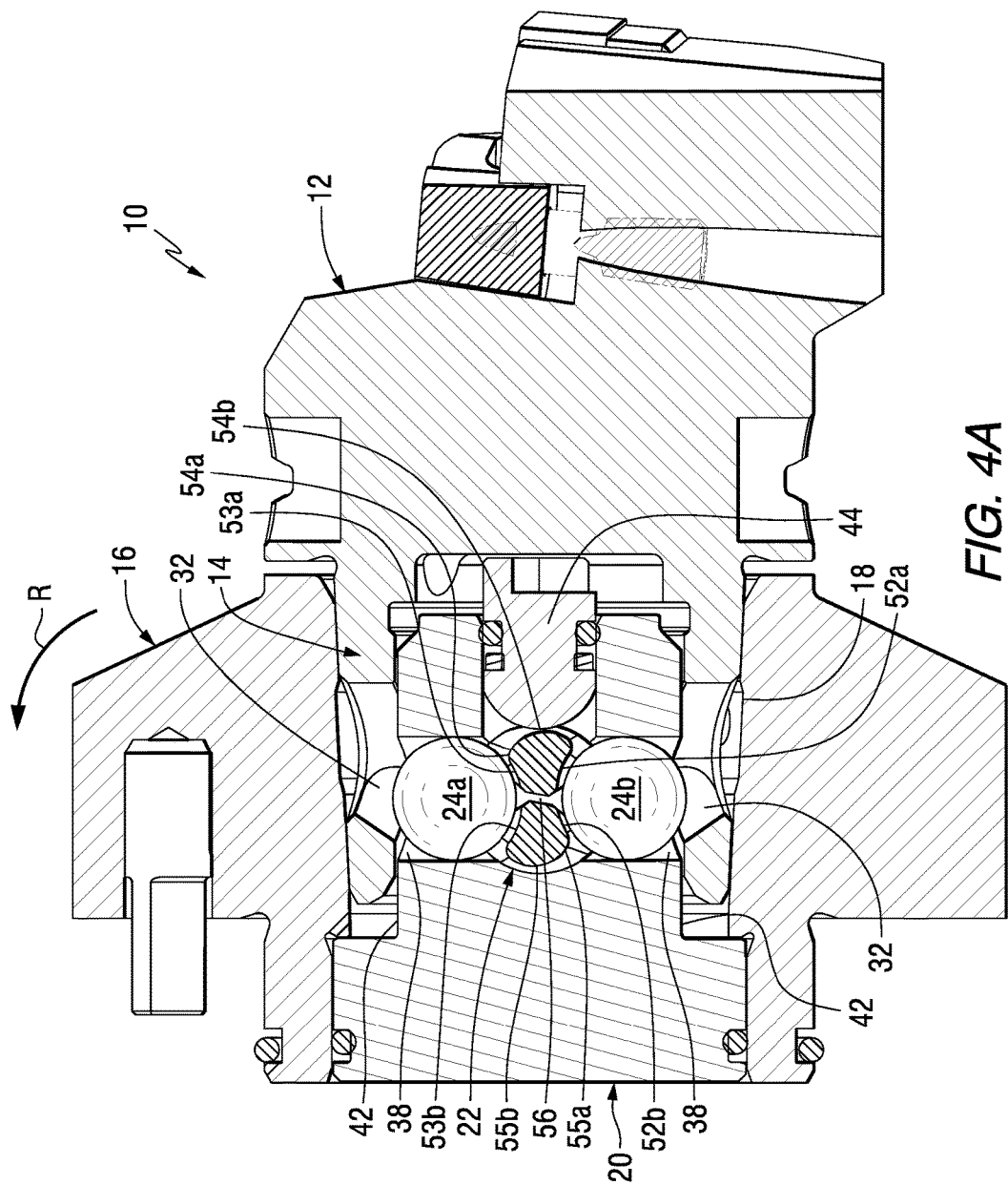
FIG. 4A illustrates a sectional view along line 4A-4A of FIG. 4 and shows the toolholder assembly in an unlocked position, in accordance with an aspect of the invention.
Figure 5:
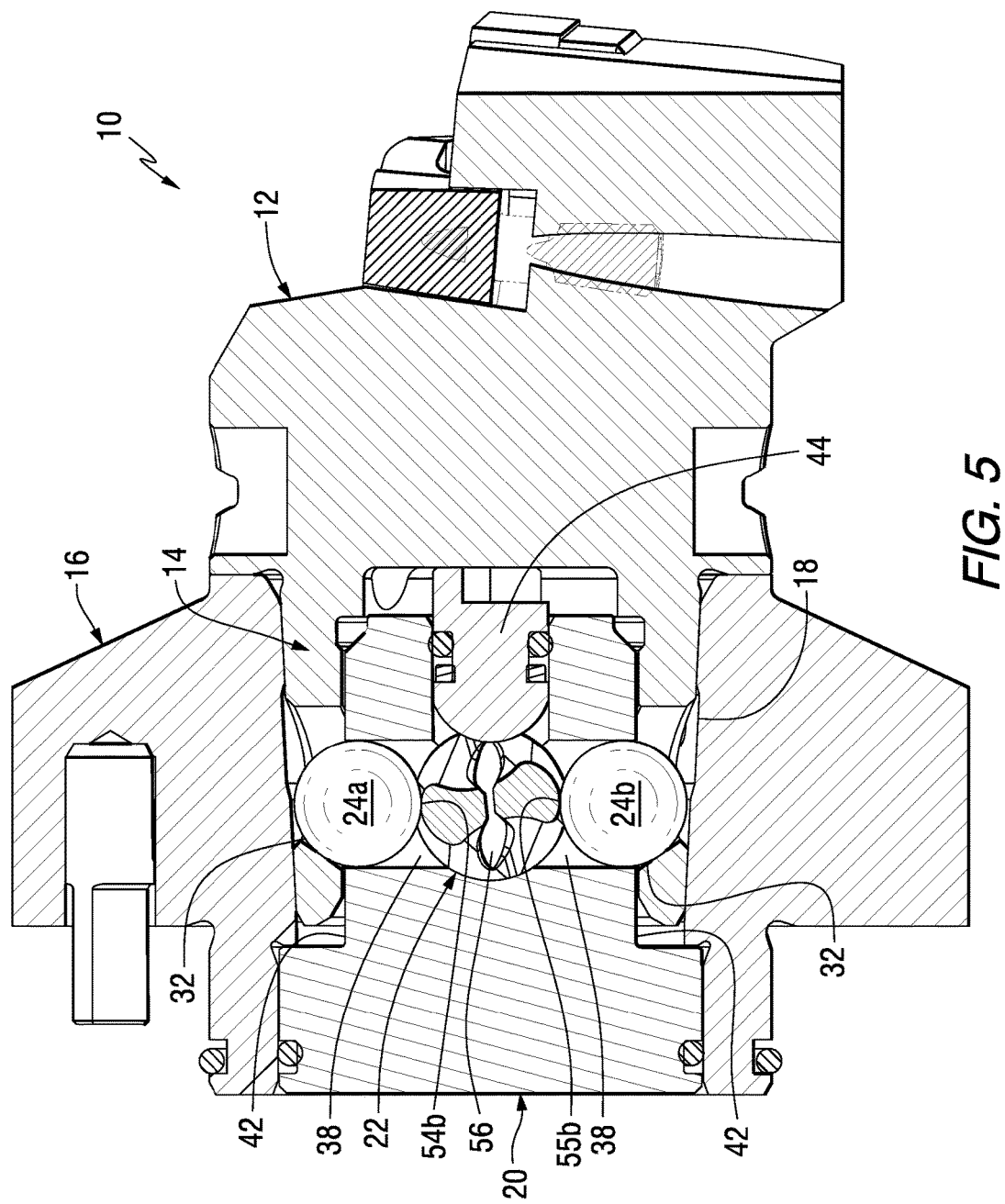
FIG. 5 illustrates a sectional view similar to FIG. 4A but shows the toolholder assembly in a locked position, in accordance with an aspect of the invention.

FIGS. 4A and 5 illustrate the lock rod 22 being rotatable between unlocked or unclamped (FIG. 4A) and locked or clamped (FIG. 5) positions for being able to easily secure and remove the toolholder 12 to and from, respectively, the toolholder assembly 10. Generally, clockwise rotation of the lock rod 22 from the FIG. 4A position to FIG. 5 position locks or clamps the toolholder 12 in place. The described rotation of the lock rod 22 causes the locking balls 24a, 24b to move radially outward within the locking passageways 38 of the canister wall 42. The locking balls 24a, 24b are moved radially outward through the locking passageways 38 by the locking rod 22 configuration, as will be described in detail herein. As the locking balls 24a, 24b travel radially outward from the locking passageways 38, they engage the locking apertures 32 within the shank wall surface 30 and the locking balls 24a, 24b become wedged therein and thus being locked or clamped between the locking apertures 32 and the locking passageways 38, as shown in FIG. 5. Counterclockwise rotation of the lock rod 22 from the FIG. 5 position results in the reverse of the described action and thus the unlocking or unclamping of the toolholder 12.

In addition, FIGS. 2, 4A and 5 illustrate that the toolholder assembly 10 may include a bump off pin 44 for cooperating with the lock rod 22 to assist in expelling the toolholder 12 from the bore 18 of the base member 16 during the unlocking or unclamping operation.

Figure 3:
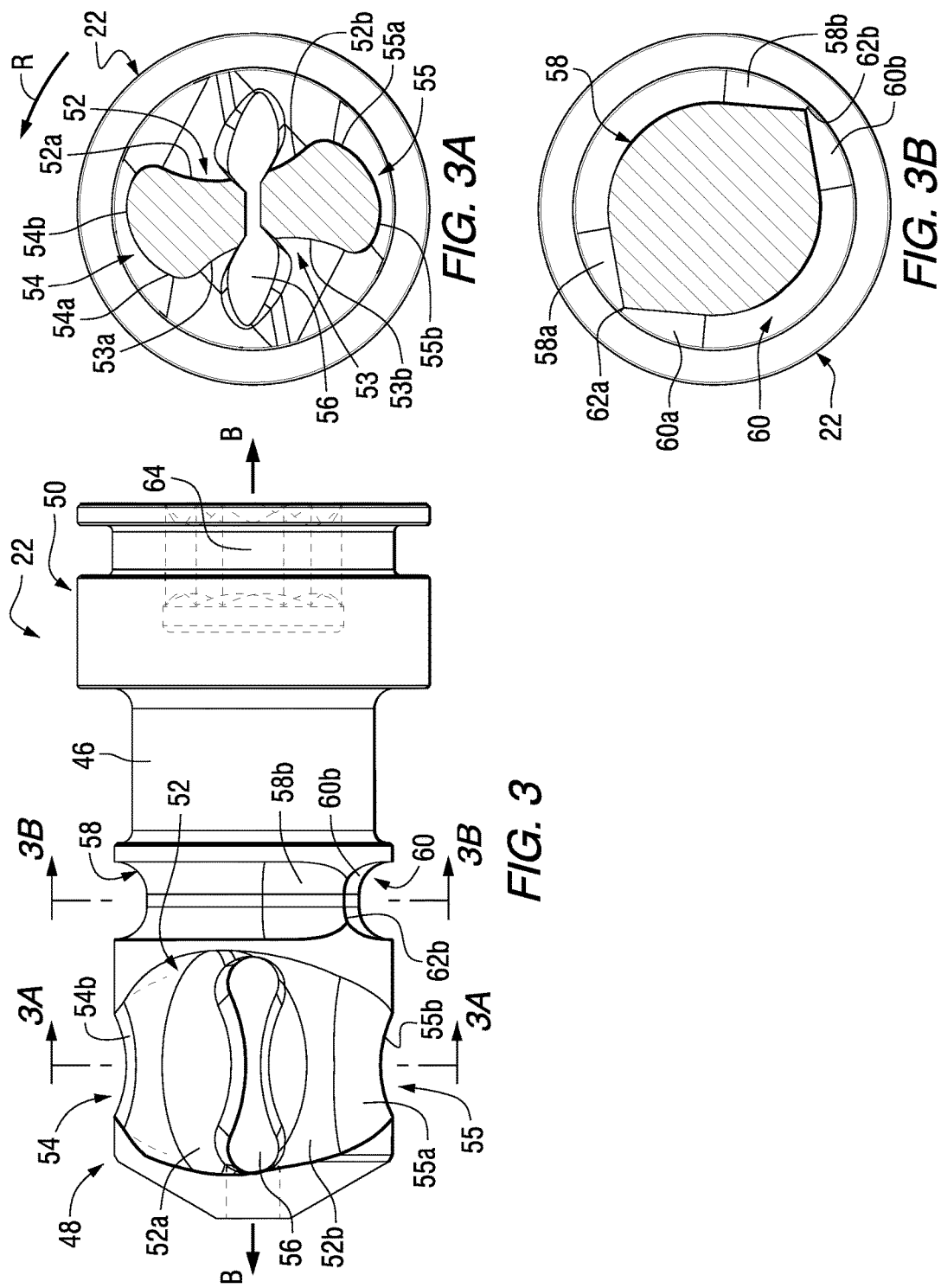
FIG. 3 illustrates a side elevational view of a lock rod, in accordance with an aspect of the invention.

As described, the toolholder assembly 10 includes a rotatable lock rod 22. FIGS. 3-3B illustrate, for example, further aspects of the lock rod 22 in accordance with the invention. The lock rod 22 includes a lock rod body 46 having an axial forward end 48 and an axial rearward end 50. In general, the axial forward end 48 is configured for cooperating or engagement with the locking balls 24a, 24b. More specifically, the axial forward end 48 of the lock rod body 46 includes at least one recess, which in one aspect includes generally opposing first and second recesses 52, 53, configured for cooperating with the locking members 24a, 24b primarily when in the unlocked or unclamped position. In one aspect, the first recess 52 includes a first portion 52a and a second portion 52b. Similarly, the second recess 53 can include a first portion 53a and a second portion 53b.

In another aspect, the axial forward end 48 of the lock rod body 46 also includes at least one ramping surface, which in this aspect includes generally opposing first and second ramping surfaces 54, 55, that are generally adjacent to the first and/or second recesses 52, 53 (see, for example, FIGS. 3, 3A). The first and second ramping surfaces 54, 55 are configured for cooperating with the locking members 24a, 24b primarily when in the locked or clamped position or while in the process of moving from the unlocked or unclamped position to the locked or clamped position. In one aspect, the first ramping surface 54 includes a transition zone 54a and a compression surface 54b and the second ramping surface 55 includes a transition zone 55a and a compression surface 55b. In one example, as the lock rod 22 is rotated in the direction of arrow R (shown in FIGS. 3 and 4A), the locking members 24a, 24b move radially outwardly from their initial unlocked or unclamped position in respective recesses 52, 53 (FIG. 4A) through and in engagement with the transition zones 54a, 55a and then to and in engagement with compression surfaces 54b, 55b (FIG. 5) of the respective first and second ramping surfaces 54, 55.

Still referring to FIGS. 3-3B, the axial forward end 48 of the lock rod body 46 further includes or defines a compression void, which in this aspect includes a compression aperture 56, generally formed through or extending through the axial forward end 48. In one aspect, the compression aperture 56 extends through at least a portion of the first and second recesses 52, 53. In another aspect, the compression aperture 56 passes through the first and second recesses 52, 53. In one aspect, the first portion 52a and second portion 52b of the first recess 52 are spaced apart or separated by the compression aperture 56. Similarly, the first portion 53a and second portion 53b of the second recess 53 are spaced apart or separated by the compression aperture 56. In another aspect, the compression aperture 56 is enclosed by the axial forward end 48 of the lock rod body 46 of the lock rod 22. It will be appreciated that the compression aperture 56 can include various shapes and configurations.

In a further aspect, the compression aperture 56 is generally symmetrical about a plane passing through longitudinal axis B-B of the lock rod 22. In another aspect, first and second ramping surfaces 54, 55 are on generally opposing sides of the compression aperture 56. The compression aperture 56 enables the ramping surfaces 54, 55 and, more particularly, enables the compression surfaces 54b, 55b thereof to deflect generally inwardly towards the compression aperture 56 at a reduced stiffness upon engagement of the locking balls 24a, 24b with the locking apertures 32. The deflection of the ramping surfaces 54, 55 and, more particularly, the deflection of the compression surfaces 54b, 55b thereof at a reduced stiffness upon engagement of the locking balls 24a, 24b with the locking apertures 32 provides additional compliance to the locking mechanism, therefore, reducing the sensitivity to variation in manufacturing and component wear from repeated use. Incorporating the reduced stiffness into the lock rod 22 allows for the elimination of other, larger components such as, for example, spring elements typically included in toolholder assemblies.

Referring to FIGS. 3 and 3B, the lock rod body 46 of the lock rod 22 may further include one or more grooves, which in this aspect includes arcuate grooves 58, 60, that extend generally circumferentially about the lock rod body 46. The grooves 58, 60 are configured to cooperate with a stop pin 62 (see, for example, FIGS. 2 and 9) to generally provide a means for stopping and/or limiting rotation of the lock rod 22, as will be described herein. In one aspect, each groove 58, 60 can include tapered portions 58a, 58b and 60a, 60b that transition into groove ends 62a, 62b, respectively. In another aspect, the grooves 58, 60 are formed axially rearward of the axial forward end 48 of the lock rod body 46. In another aspect, the grooves 58, 60 are formed adjacent the axial forward end 48 of the lock rod body 46.

In addition, FIGS. 1-3 illustrate that the lock rod 22 can include an internal hex opening 64 for insertion of a tool (not shown) to cause rotation of the lock rod 22. Other similar configurations can be provided for causing rotation as well.

Figure 6:
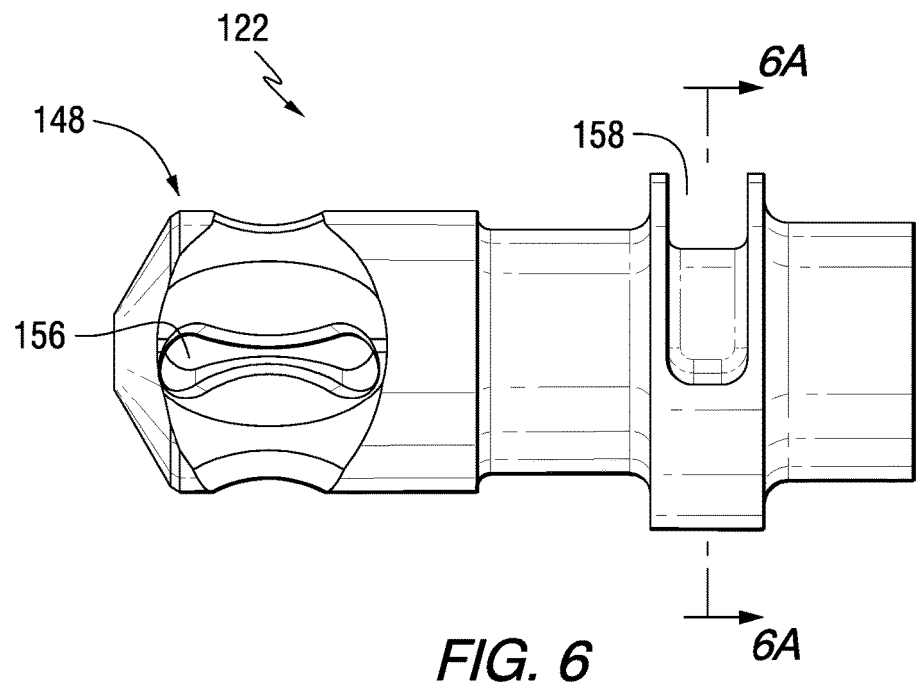
FIG. 6 illustrates a side elevational view of an additional lock rod, in accordance with an aspect of the invention.
Figure 6A:
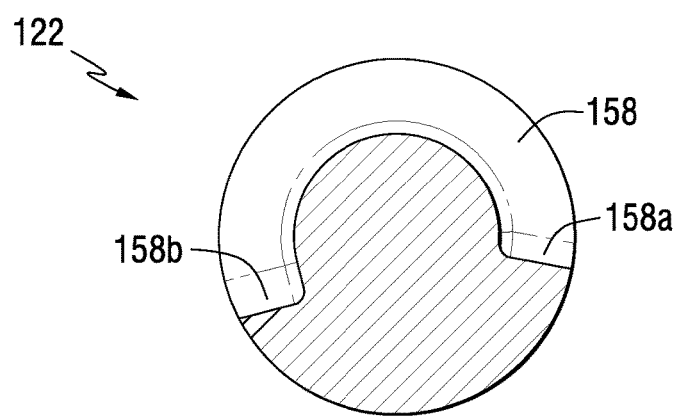
FIG. 6A illustrates a sectional view along line 6A-6A of FIG. 6, in accordance with an aspect of the invention.

Referring to FIGS. 6 and 6A, there is illustrated an additional lock rod 122 for use with a toolholder assembly 110 (see, for example, FIG. 7), in accordance with aspects of the invention. The lock rod 122 is similar in structure and function to lock rod 22 in that it includes essentially the same axial forward end 148 with a compression aperture 156 etc. However, one difference between the lock rods 22 and 122 is that the lock rod 122 includes an arcuate groove 158 that extends circumferentially around only a portion thereof. In addition, the groove 158 is more axially rearward in comparison to the grooves 58, 60 of lock rod 22 for the purpose as will be shown and described in relation to FIGS. 7-8.

Figure 7A:
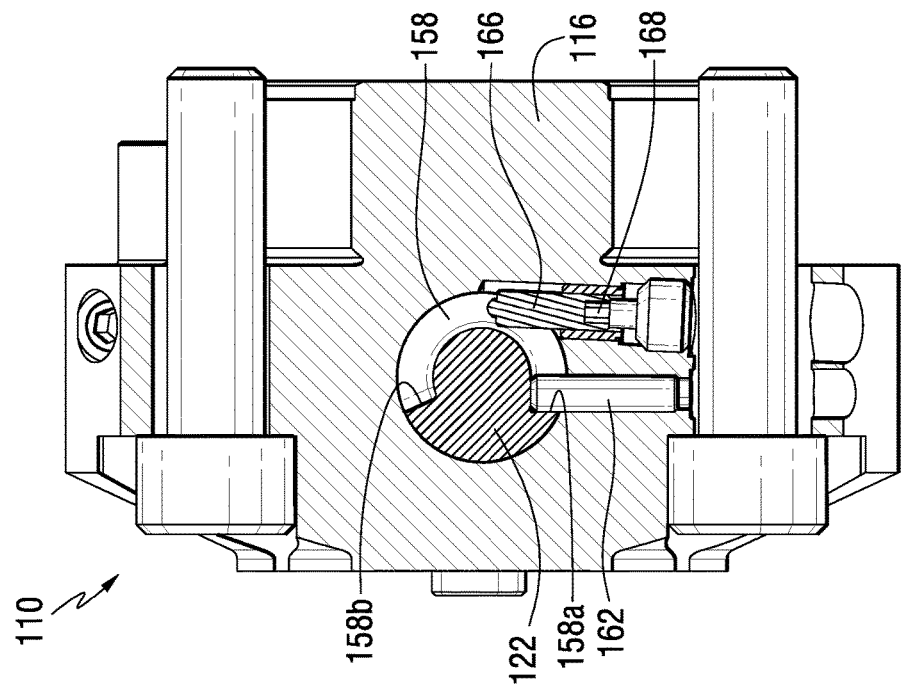
FIG. 7A illustrates a sectional view along line 7A-7A of FIG. 7 and shows the toolholder assembly in an unlocked position, in accordance with an aspect of the invention.
Figure 7:
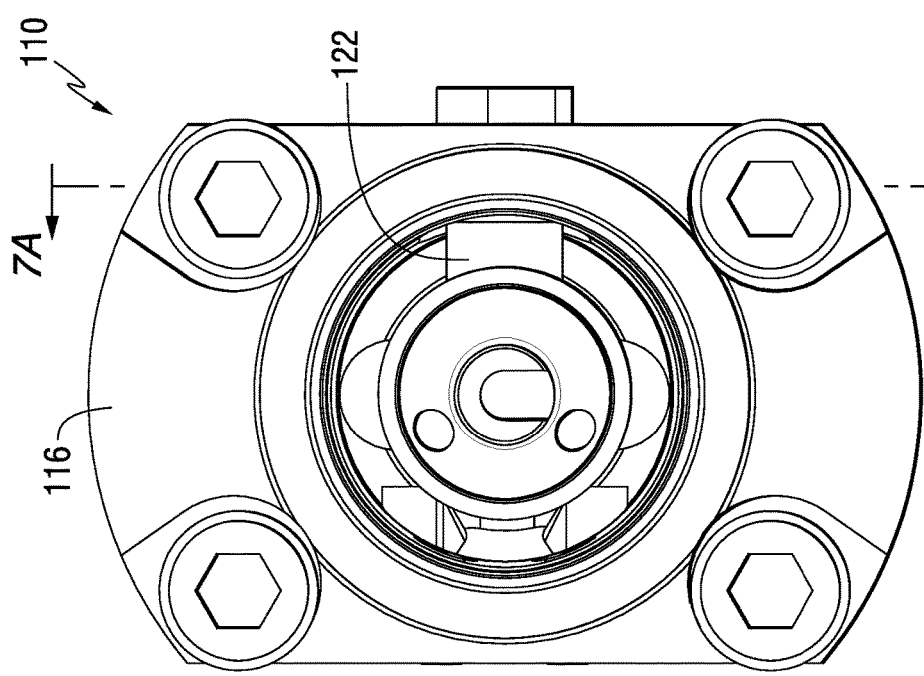
FIG. 7 illustrates a top view of a portion of a toolholder assembly that incorporates the lock rod shown in FIG. 6, in accordance with an aspect of the invention.
Figure 8:
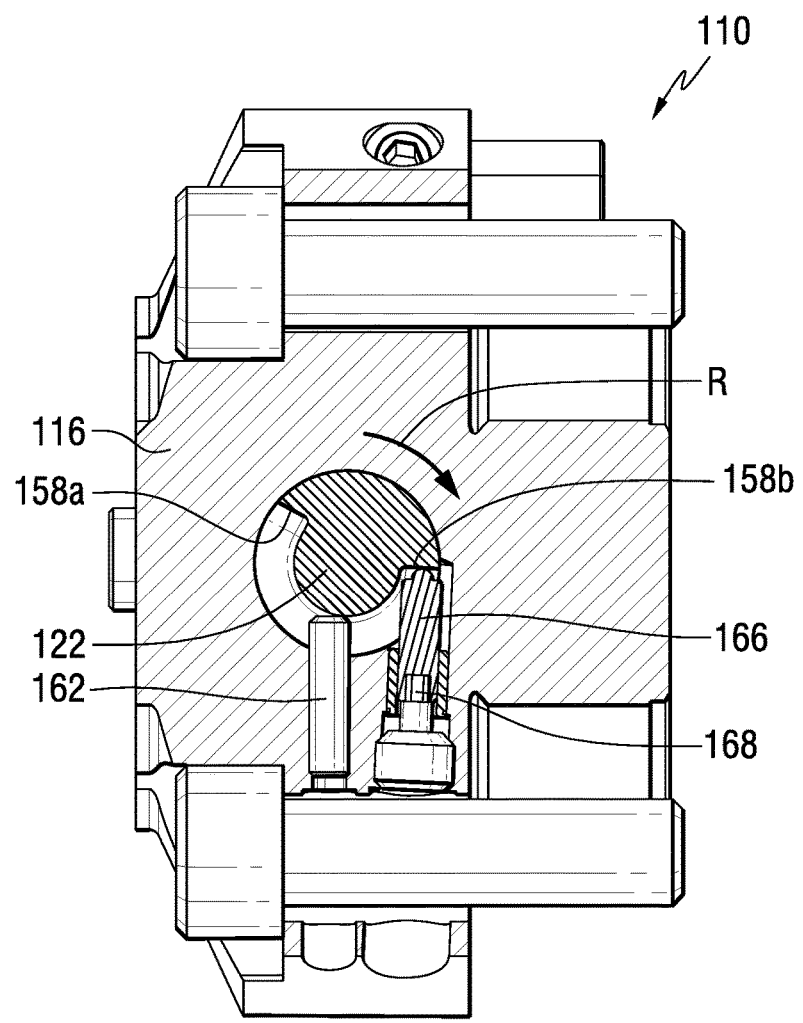
FIG. 8 illustrates a sectional view similar to FIG. 7A but shows the toolholder assembly in a locked position, in accordance with an aspect of the invention.

FIGS. 7-8 illustrate the lock rod 122 as configured for cooperating with the toolholder assembly 110 and, more particularly, to illustrate the lock rod 122 in association with providing a means for stopping and/or limiting rotation of the lock rod 122. For example, FIG. 7A shows a stop pin 162 configured for cooperating with a first end 158a of groove 158 to limit and/or stop rotational movement of the lock rod 122 in the unlocked or unclamped position. It will be appreciated that in this aspect of the invention the stop pin 162 extends into or through at least a portion of the base member 116 of the toolholder assembly 110 in order to cooperate with the groove 158.

FIG. 8 illustrates rotation of the lock rod 122 in the direction of arrow R to a locked or clamped position. As shown, an adjustment screw arrangement having, for example, an adjustment screw 166 with drive socket 168 is configured for cooperating with a first end 158b of groove 158 to limit and/or stop rotational movement of the lock rod 122 in the locked or clamped position. It will be appreciated that in this aspect of the invention the adjustment screw 166 and/or the drive socket 168 extends into or through at least a portion of the base member 116 of the toolholder assembly 110 in order to cooperate with the groove 158. Advantageously, the adjustment screw 166 allows for control of the rotational limits of lock rod 122 that controls the locking position of the locking balls on the ramping surfaces (e.g., the locking balls 24a, 24b on the ramping surfaces 54a, 54b as described herein). In addition, the control of the rotational limits of lock rod 122 advantageously allows for adjustment of the force generated by the clamping mechanism.

Figure 9:
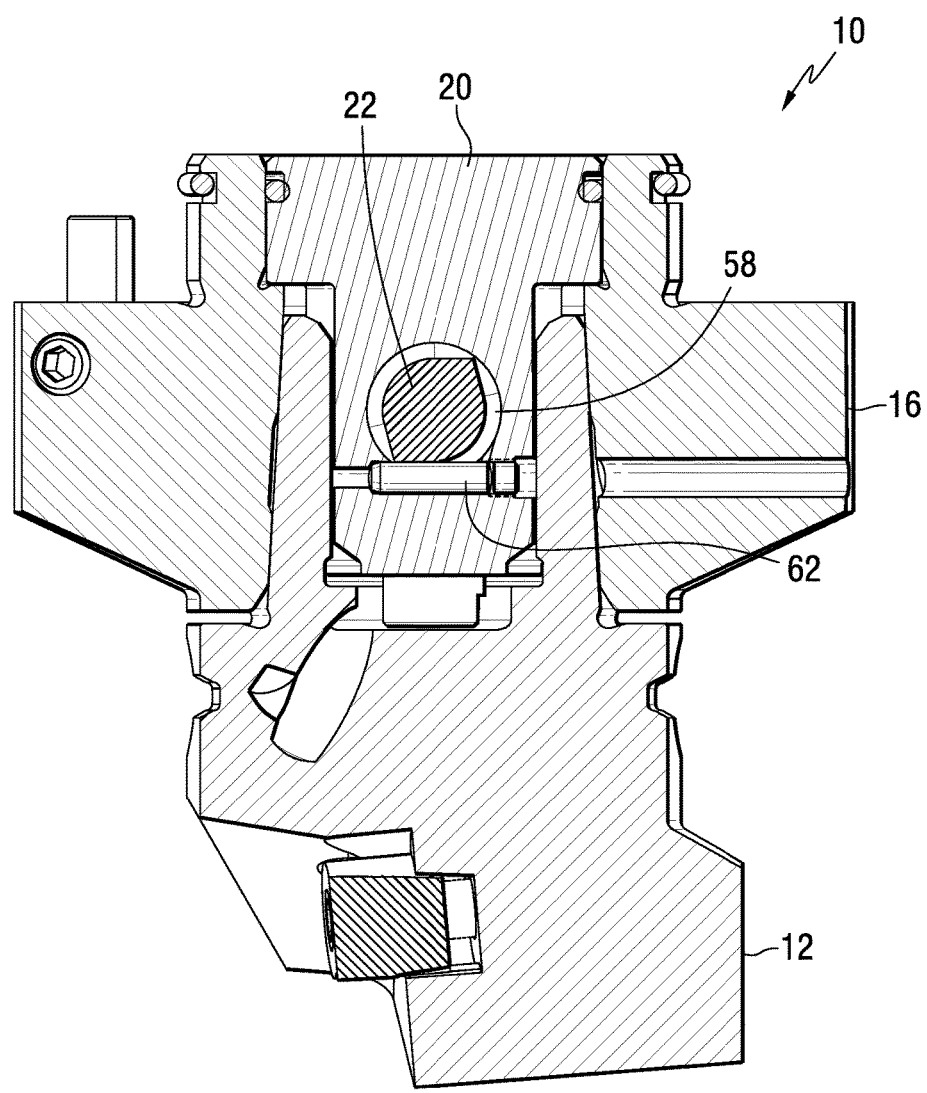
FIG. 9 illustrates a sectional view of a toolholder assembly, such as shown in FIG. 1, in an unlocked position, in accordance with an aspect of the invention.

FIG. 9 is similar to FIG. 7A but shows stop pin 62 acting in cooperation with groove 58 of lock rod 22 when in the unlocked or unclamped position. It will be appreciated that in this aspect of the invention the stop pin 62 extends into or through at least a portion of the canister 20 of the toolholder assembly 10 in order to cooperate with the groove 58. It will further be appreciated that this configuration is possible due to the groove 58, 60 being configured more axially forward than the groove 158 of lock rod 122. In addition, rotation of the lock rod 22 to the locked or clamped position results in the stop pin 62 cooperating with the groove 58 to stop or limit rotational movement of the lock rod 22, i.e. no adjustment screw arrangement is needed as the stop pin 62 serves as the stop in the unlocked/unclamped position and the locked/clamped position.

Figure 10:
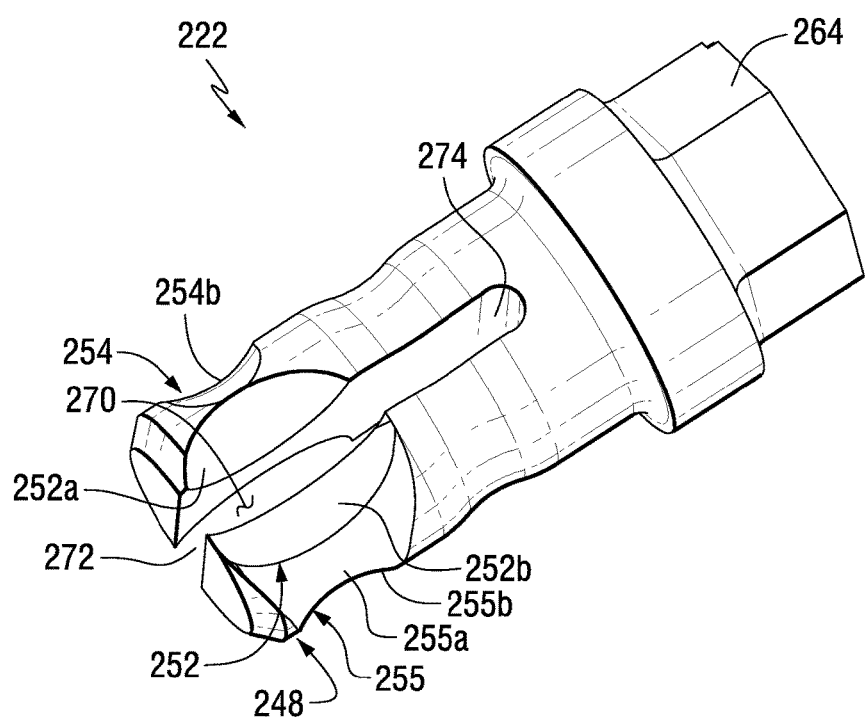
FIG. 10 illustrates an isometric view of an additional lock rod, in accordance with an aspect of the invention.
Figure 10A:
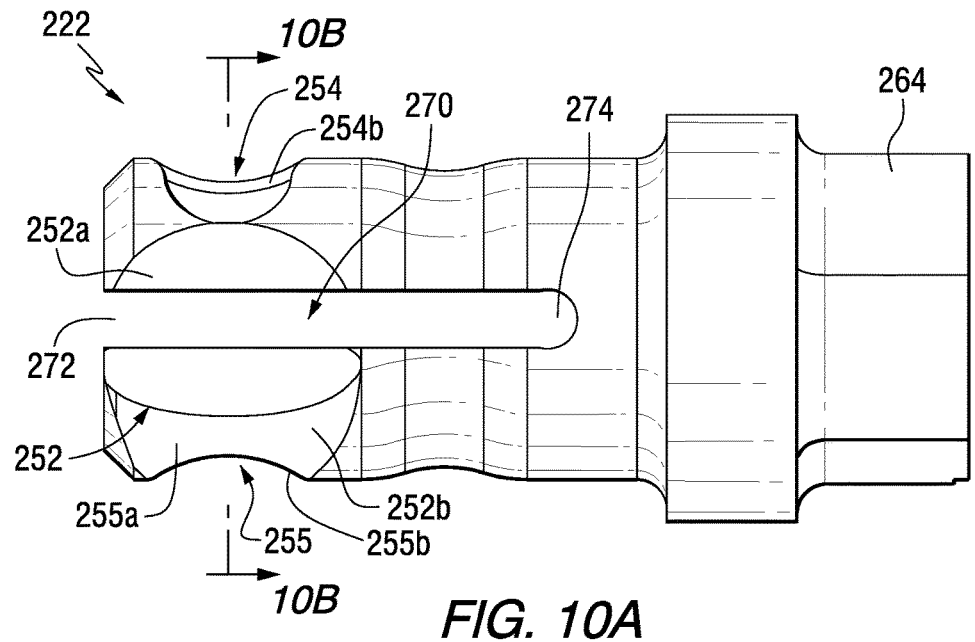
FIG. 10A illustrates a side elevational view of the lock rod of FIG. 10, in accordance with an aspect of the invention.
Figure 10B:
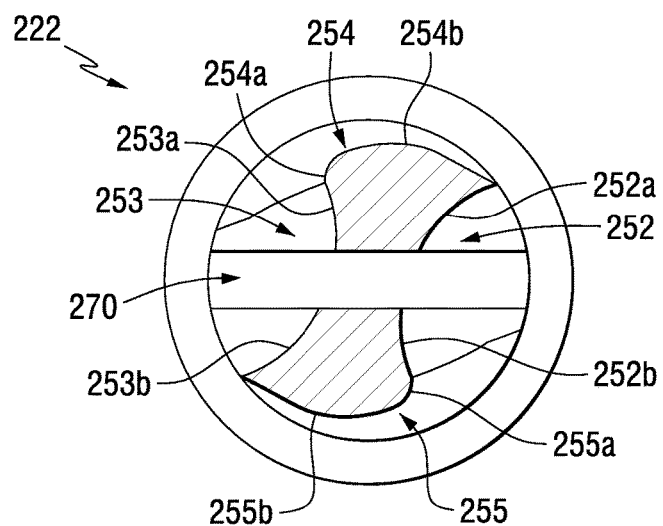
FIG. 10B illustrates a sectional view along line 10B-10B of FIG. 10A, in accordance with an aspect of the invention.

In accordance with another aspect of the invention, FIGS. 10-10B illustrate an additional lock rod 222. Lock rod 222 is similar in operation and function to lock rods 22, 122, as described herein, but incorporates as the compression void a compression slot 270 formed in the axial forward end 248 thereof. The compression slot 270 has an open end 272 and the slot 270 extends axially rearward to a closed end 274. Similar to the axial forward end 48 of lock rod 22, the axial forward end 248 includes first and second recesses 252, 253 with the compression slot 270 configured for passing through or extending through at least a portion of the first and second recesses 252, 253. In one aspect, the first recess 252 includes a first portion 252a and a second portion 252b. Similarly, the second recess 253 can include a first portion 253a and a second portion 253b. In addition, first and second ramping surfaces 254, 255 are also provided and configured on generally opposing sides of the compression slot 270. In one aspect, the first ramping surface 254 includes a transition zone 254a and a compression surface 254b and the second ramping surface 255 includes a transition zone 255a and a compression surface 255b. The slot 270 reduces the stiffness of the ramping surfaces 254, 255 and, in particular, of the compression surfaces 254b, 255b to allow for deflection thereof. Advantageously, this reduction in stiffness provides additional compliance in the locking mechanism and reduces the sensitivity of the design to manufacturing variation and component wear from repeated use. This eliminates the need for other commonly used components such as, for example, additional spring elements in the assembly.

As shown in FIGS. 10 and 10A, the lock rod 222 incorporates an external drive (e.g. hex) arrangement 264 for causing rotation thereof.

Whereas particular embodiments of this invention have been described above for purposes of illustration, it will be evident to those skilled in the art that numerous variations of the details of the present invention may be made without departing from the invention as defined in the appended claims.

What is claimed is:
1. A toolholder assembly, comprising:
a toolholder having a rearwardly facing toolholder shank and an axial rearward end with an internal bore intersecting the axial rearward end, the toolholder shank having an outer surface and at least one locking aperture that extends from the outer surface to the internal bore;
a base member having a bore configured for receiving the toolholder shank;
a canister configured for receipt in the bore of the base member, the canister having an outer surface and a canister bore that extends longitudinally through the canister, the canister having at least one locking passageway that extends from the outer surface of the canister to the canister bore, wherein the at least one locking passageway is in communication with the at least one locking aperture of the toolholder shank;

a lock rod with an axial forward end and an axial rearward end, wherein the axial forward end of the lock rod includes a compression aperture formed therethrough; and at least one locking member in communication with the axial forward end of the lock rod and movably positioned at least partially in the at least one locking passageway and/or the at least one locking aperture;

wherein the compression aperture permits deflection of at least a portion of the axial forward end of the lock rod when the at least one locking member is in engagement with the at least a portion of the axial forward end of the lock rod.

2. The toolholder assembly of claim 1, wherein the lock rod is rotatable about a longitudinal axis thereof between an unlocked position and a locked position.

3. The toolholder assembly of claim 2, wherein the longitudinal axis of the lock rod is non-parallel to a longitudinal axis of the toolholder.

4. The toolholder assembly of claim 2, wherein the axial forward end of the lock rod includes at least one recess configured for cooperating with the at least one locking member when in the unlocked position.

5. The toolholder assembly of claim 4, wherein the axial forward end of the lock rod includes at least one ramping surface adjacent to the at least one recess and configured for cooperating with the at least one locking member when in the locked position.

6. The toolholder assembly of claim 4, wherein the compression aperture extends through at least a portion of the at least one recess.

7. The toolholder assembly of claim 2, wherein the at least one locking member includes first and second locking balls and the axial forward end of the lock rod includes generally opposing first and second recesses for cooperating with the first and second locking balls, respectively, when in the unlocked position.

8. The toolholder assembly of claim 7, wherein the axial forward end of the lock rod includes first and second ramping surfaces adjacent to the first and second recesses, respectively.

9. The toolholder assembly of claim 7, wherein the compression aperture passes through the first recess and the second recess.

10. The toolholder assembly of claim 7, wherein the first and second ramping surfaces are on opposing sides of the compression aperture.

11. The toolholder assembly of claim 2, further including stop means for limiting rotation of the lock rod.

12. The toolholder assembly of claim 11, wherein said stop means includes an arcuate groove formed in the lock rod and a stop pin configured for cooperating with the arcuate groove.

13. The toolholder assembly of claim 11, wherein said stop means includes an arcuate groove formed in the lock rod and an adjustment screw configured for cooperating with the arcuate groove.

14. A toolholder assembly, comprising:

a toolholder having a rearwardly facing toolholder shank and an axial rearward end with an internal bore intersecting the axial rearward end, the toolholder shank having an outer surface and at least one locking aperture that extends from the outer surface to the internal bore;

a base member having a bore configured for receiving the toolholder shank;

a canister configured for receipt in the bore of the base member, the canister having an outer surface and a canister bore that extends longitudinally through the canister, the canister having at least one locking passageway that extends from the outer surface of the canister to the canister bore, wherein the at least one locking passageway is in communication with the at least one locking aperture of the toolholder shank;

a lock rod with an axial forward and an axial rearward end, wherein the axial forward end of the lock rod includes a compression slot formed therein; and at least one locking member in communication with the axial forward end of the lock rod and movably positioned at least partially in the at least one locking passageway and/or the at least one locking aperture;

wherein the compression slot permits deflection of at least a portion of the axial forward end of the lock rod when the at least one locking member is in engagement with the at least a portion of the axial forward end of the lock rod.

15. The toolholder assembly of claim 14, wherein the lock rod is rotatable about a longitudinal axis thereof between an unlocked position and a locked position.

16. The toolholder assembly of claim 15, wherein the axial forward end of the lock rod includes at least one recess configured for cooperating with the at least one locking member when in the unlocked position.

17. The toolholder assembly of claim 16, wherein the axial forward end of the lock rod includes at least one ramping surface adjacent to the at least one recess and configured for cooperating with the at least one locking member when in the locked position.

18. The toolholder assembly of claim 17, wherein the at least one ramping surface includes first and second ramping surfaces configured on opposing sides of the compression slot.

19. The toolholder assembly of claim 1, wherein:

the lock rod is movable between an unlocked position and a locked position; and the compression aperture permits deflection of at least a portion of the axial forward end of the lock rod when the lock rod is in the locked position and/or moving between the unlocked position and the locked position.

20. The toolholder assembly of claim 14, wherein:

the lock rod is movable between an unlocked position and a locked position;

the axial forward end of the lock rod includes at least one recess configured for cooperating with the at least one locking member in the unlocked position; and the at least a portion of the axial forward end of the lock rod, which undergoes the deflection, includes at least one ramping surface adjacent to the at least one recess and configured for cooperating with the at least one locking member in the locked position.

21. A toolholder assembly, comprising:

a toolholder having a rearwardly facing toolholder shank and an axial rearward end with an internal bore intersecting the axial rearward end, the toolholder shank having an outer surface and at least one locking aperture that extends from the outer surface to the internal bore;

a base member having a bore configured for receiving the toolholder shank;

a canister configured for receipt in the bore of the base member, the canister having an outer surface and a canister bore that extends longitudinally through the canister, the canister having at least one locking passageway that extends from the outer surface of the canister to the canister bore, wherein the at least one locking passageway is in communication with the at least one locking aperture of the toolholder shank;

a lock rod with an axial forward end and an axial rearward end, wherein the axial forward end of the lock rod includes a compression aperture formed therethrough;

the lock rod being rotatable about a longitudinal axis thereof between an unlocked position and a locked position; and at least one locking member in communication with the axial forward end of the lock rod and movably positioned at least partially in the at least one locking passageway and/or the at least one locking aperture.

22. A toolholder assembly, comprising:

a toolholder having a rearwardly facing toolholder shank and an axial rearward end with an internal bore intersecting the axial rearward end, the toolholder shank having an outer surface and at least one locking aperture that extends from the outer surface to the internal bore;

a base member having a bore configured for receiving the toolholder shank;

a canister configured for receipt in the bore of the base member, the canister having an outer surface and a canister bore that extends longitudinally through the canister, the canister having at least one locking passageway that extends from the outer surface of the canister to the canister bore, wherein the at least one locking passageway is in communication with the at least one locking aperture of the toolholder shank;

a lock rod with an axial forward end and an axial rearward end, wherein the axial forward end of the lock rod includes a compression slot formed therein;

the lock rod being rotatable about a longitudinal axis thereof between an unlocked position and a locked position; and at least one locking member in communication with the axial forward end of the lock rod and movably positioned at least partially in the at least one locking passageway and/or the at least one locking aperture.

* * * * *